United States Patent [19]

Tomioka

[11] Patent Number: 5,984,189
[45] Date of Patent: Nov. 16, 1999

[54] SHEET FOR DATA CODES AND METHOD OF RECOGNIZING THESE CODES

[76] Inventor: Makoto Tomioka, 2-3-23 Soya, Ichikawa-shi, Japan

[21] Appl. No.: 08/179,779

[22] Filed: Jan. 10, 1994

Related U.S. Application Data

[62] Continuation of application No. 07/770,713, Oct. 3, 1991, abandoned, which is a continuation of application No. 07/362,402, filed as application No. PCT/JP88/00895, Sep. 5, 1988, abandoned.

[30] Foreign Application Priority Data

Sep. 4, 1987 [JP] Japan ................... 62-221768

[51] Int. Cl.$^6$ ................................................ G06K 19/00
[52] U.S. Cl. ............................................ 235/487; 235/488
[58] Field of Search .................... 235/494, 487, 235/488; 250/208.6

[56] References Cited

U.S. PATENT DOCUMENTS

| | | | |
|---|---|---|---|
| 3,718,821 | 2/1973 | Vischulis | 250/208.6 |
| 3,776,454 | 12/1973 | Jones | 235/494 |
| 3,938,088 | 2/1976 | Clark | 235/494 |
| 4,172,554 | 10/1979 | Clarinval | 235/494 |
| 4,283,622 | 8/1981 | Passer | 235/494 |
| 4,286,146 | 8/1981 | Uno | 235/494 |
| 4,439,672 | 3/1984 | Salaman | 235/494 |
| 4,488,679 | 12/1984 | Bockholt et al. | 235/472 |
| 4,521,772 | 6/1985 | Lyon | 235/472 |
| 4,544,836 | 10/1985 | Galvin et al. | 235/487 |
| 4,614,366 | 9/1986 | North | 235/375 |
| 4,707,612 | 11/1987 | Martin | 235/494 |

FOREIGN PATENT DOCUMENTS

| | | |
|---|---|---|
| 1115882 | 4/1956 | France . |
| 54-45539 | 4/1979 | Japan . |
| 57-168381 | 10/1982 | Japan . |
| 191788 | 2/1983 | Japan . |
| 61-234479 | 10/1986 | Japan . |
| 234479 | 3/1987 | Japan . |

OTHER PUBLICATIONS

Int Search Report PCT/JP88/00895 for PCT/ISA/210 (second sheet).

*Primary Examiner*—Harold I. Pitts
*Attorney, Agent, or Firm*—Vanophem Meehan & Vanophem, P.C.

[57] ABSTRACT

A data code having at least one unit, each unit being divided into at least two regions having similar dimensions. Selected regions of each unit are shaded to represent a unique value. Each unit has a unique arrangement of shaded regions to represent a particular characteristic whereby the data code may represent a decimal, a hexidecimal or a binary notation. This code does not require accurate printing, thereby enabling a user to read the code directly. A code sensor is used for reading the code.

23 Claims, 6 Drawing Sheets

| | | | |
|---|---|---|---|
| A | | 1 1 1 1 | ■ |
| B | 0 0 0 0 | 0 0 0 1 | |
| C | | 0 0 1 0 | |
| D | | 0 1 0 0 | |
| E | | 0 0 0 0 | |
| F | 0 0 0 1 | 0 0 0 1 | |
| G | | 0 0 1 0 | |
| H | | 0 1 0 0 | |
| I | | 0 0 0 0 | |
| J | | 0 0 0 1 | |
| K | 0 0 1 0 | 0 0 1 0 | |
| L | | 0 1 0 0 | |
| M | | 1 0 0 0 | |
| N | | 0 0 1 1 | |
| O | | 0 0 0 0 | |
| P | | 0 0 0 1 | |
| Q | 0 1 0 0 | 0 0 1 0 | |
| R | | 0 1 0 0 | |
| S | | 1 0 0 0 | |
| T | | 0 0 1 1 | |
| U | | 0 0 0 0 | |
| V | | 0 0 0 1 | |
| W | 1 0 0 0 | 0 0 1 0 | |
| X | | 0 1 0 0 | |
| Y | | 1 0 0 0 | |
| Z | | 0 0 1 1 | |

(a)

(b)

(c)

SHEET FOR DATA CODES AND METHOD OF RECOGNIZING THESE CODES

This is a continuation of application Ser. No. 07/770,713, filed Oct. 3, 1991, now abandoned, which is a continuation of Ser. No. 07/362,402, filed Jul. 5, 1989 now abandoned, filed as PCT/JP88/00895, filed Sep. 5, 1988.

The present invention relates to a data code and apparatus for reading the data code.

DESCRIPTION OF THE PRIOR ART

Heretofore, conventional bar codes have been used for printing a code onto various products and for use in all aspects of manufacturing and at point of sale retail stores. The bar code system constitutes a plurality of parallel, aligned bars, each bar having a given width to represent a particular number or character.

The bar code is read by illuminating the code with a beam of light and the reflected light is read by an optical sensor. The sensor may be, for example, of a fixed beam type in which the object having the code printed thereon is moved in front of it. Alternatively, the sensor may be of the moving type whereby the object having the code printed thereon is fixed and the sensor is moved across the code.

The reflected light forms analog signals which are converted by the sensor to digital signals and then these signals are image processed by a microprocessor to extract the relevant information. This results in the optical sensor being relatively complex and expensive. Since the bar widths are used to represent numbers or characters, the bar code must be printed with great accuracy to ensure that the code accurately represents the information required. Furthermore, a user merely looking at the code is unable to decipher the information written thereon since the naked eye is unable to accurately determine the widths of the bars.

A code has been proposed, which is described in pending PCT application no. JP87/0007. The code includes at least one unit which is into at least two regions having substantially similar dimensions, whereby each characteristic of the code has a particular arrangement of shaded and/or blank regions. One known disadvantage with this code is that only decimal notation such as numerals 0–9 may be represented. Another known disadvantage with this code is that the orientation of each unit cannot be determined and hence inaccurate data may be extracted.

In addition, one well known code is binary notation, which finds special application in computing or microprocessing fields. However, most users are not used to working in binary, but are highly proficient in using decimal notation. Conversion from decimal to binary and vice versa is not easily computed manually and is usually done by a machine. Heretofore, there are no known codes which easily allow a user to convert between decimal and binary notation.

SUMMARY OF THE INVENTION

An object of the present invention is to provide a data code and apparatus for reading such a data code which alleviates the aforementioned disadvantages.

According to the present invention there is provided a data code having at least one unit which is divided into at least two regions having similar dimensions. Each region corresponds to a column of binary notation commencing with the lowest order column and thereafter the successive columns, identical regions of each unit representing the same column and each unit having a particular arrangement of shaded regions to represent a particular value.

According to the present invention there is also provided an apparatus for reading a data code. The data code has at least with each unit of the data code being divided into at least two regions having similar dimensions. Each region corresponds to a column of binary notation commencing with the lowest order column and thereafter the successive columns, identical regions of each unit representing the same column and each unit having a particular arrangement of shaded regions to represent a particular value. The apparatus comprising means for illuminating each unit of the bar code means for receiving the reflected illumination from each unit and a decoder coupled to the receiving means for identifying a reflection from a shaded region as a binary 1 and from a blank region as a binary 0 for enabling the data code to be read directly.

According to the present invention there is also provided an apparatus for reading a data code. The data code has at least one unit which is divided into at least two regions having similar dimensions. Each region corresponds to a column of binary notation commencing with the lowest order column and thereafter the successive columns, identical regions of each unit representing the same column and each unit having a particular arrangement of shaded regions to represent a particular value. The apparatus has means for illuminating the data code, an image sensor for receiving the illumination via the data code and for producing a signal dependent upon the illumination received. Means for storing the signal and display means for sequentially displaying the signal are also provided.

Embodiments of the present invention will now be described, by way of example only, with reference to the accompanying drawings.

BRIEF DESCRIPTION OF THE DRAWINGS

FIG. 6 schematically illustrates the data code representing each letter of the Roman Alphabet;

DETAILED DESCRIPTION OF THE PREFERRED EMBODIMENT

Figure 1:
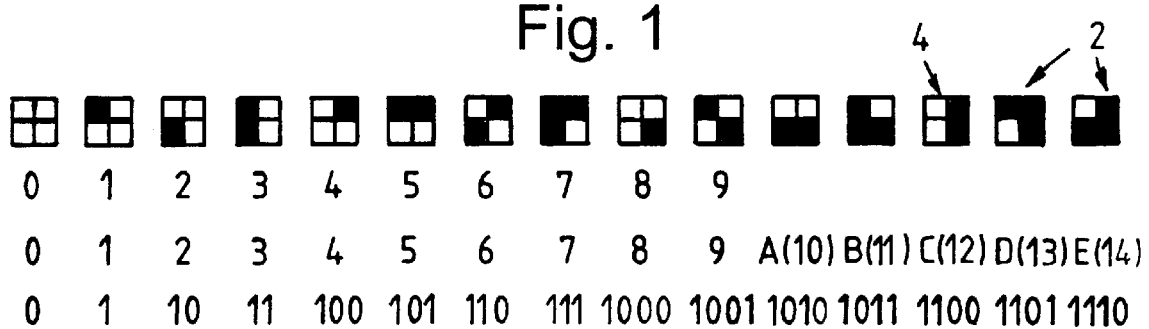
FIG. 1 is a schematic representation of an embodiment of the data code in which each unit of the data code corresponds to the respective decimal, hexadecimal or binary notation.

An embodiment of the data code is shown in FIG. 1 as shown, the date code has a number of units 2, each of which are divided into four equal regions 4. Each of the regions 4 of any unit 2 may be shaded, or printed manually to create a unique arrangement of shaded and blank regions to define a particular unit and hence a particular characteristic of the data code. Each of the decimal numbers 0 to 9 are represented by a particular combination of blank and shaded regions.

Each of the units shown in FIG. 1 is composed of four regions, however two or more regions may be used for each unit. Furthermore, each region may form a rectangular, circular or triangular shape, but each of the regions must have substantially similar dimensions for a particular data code.

Each of the units 2 of the data code is used to represent decimal, hexidecimal or binary notation as shown in FIG. 1. Here each region represents a column of binary notation starting with the lowest order column, 1, and successive columns 2, 4, 8. Hence numerals in decimal or other binary notation can be represented. If respective regions for each unit always represent the same column then the value of a unit can be determined at a glance.

Figure 2:
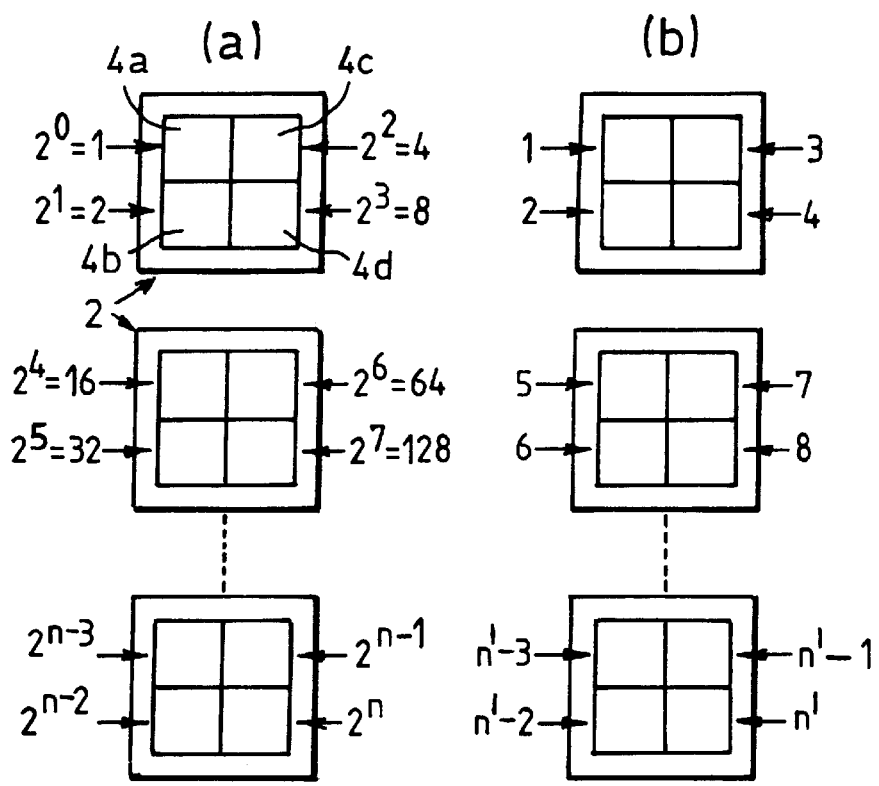
FIG. 2 illustrates each region of the data code representing binary or decimal notation as shown in FIG. 1.

FIG. 2 further illustrates the data code being used to represent decimal, hexidecimal or binary notation. The decimal numbers 1, 2, 4 and 8 may be printed onto the data code sheet before any one of the regions are shaded. These numbers are directly related to binary or hexidecimal notation since each region 4 is used to represent a column of notation, for example the 1, 10, 100, 1000 in binary notation. For example, 4a represents column $2^0$, equivalent to the decimal or hexidecimal number 0 or the binary number 1; 4b represents column $2^1$, equivalent to the decimal or hexadecimal number 2 or the binary number 10; region 4c represents column $2^2=4=100$: and similarly region 4d represents $2^3=8=1000$. A number of units may be used to represent larger numbers. Accordingly, each unit 2 may be used to represent decimal, hexidecimal, or binary notation.

Figure 3:
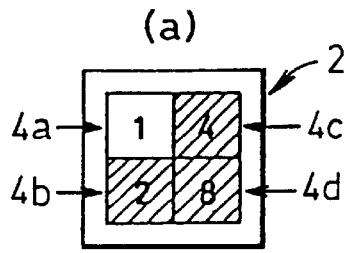
FIG. 3 illustrates examples of the data code according to FIG. 1.
Figure 3:
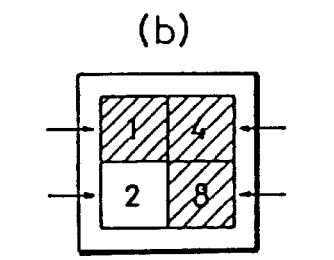
Figure 3:
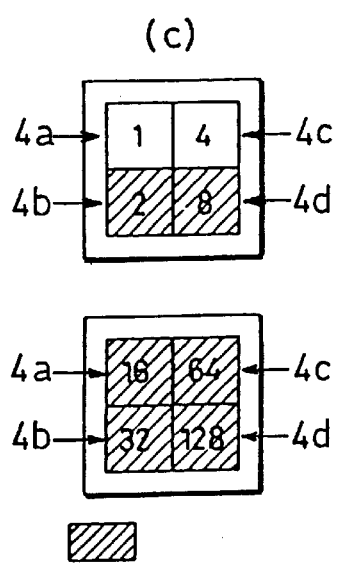

As shown in FIG. 3, the unit 2 may also have decimal notation printed on each of the regions 4. Thus in FIG. 3a regions 4b, 4c, and 4d are shaded thus indicating that the unit represents the decimal number 14 (since 2+4+8=14) and the binary number 1110. Similarly the unit illustrated in FIG. 3b represents the decimal number 13 and the binary number 1101 and the two vertically disposed units in FIG. 3c represent the decimal number 250 and the binary number 11111010. Thus the data code easily enables a user to identify a binary or a decimal notation merely by viewing the data code.

Computers are generally based on hexadecimal notation and the data code is applicable to such notation and, therefore, directly compatable with computers.

Figure 4:
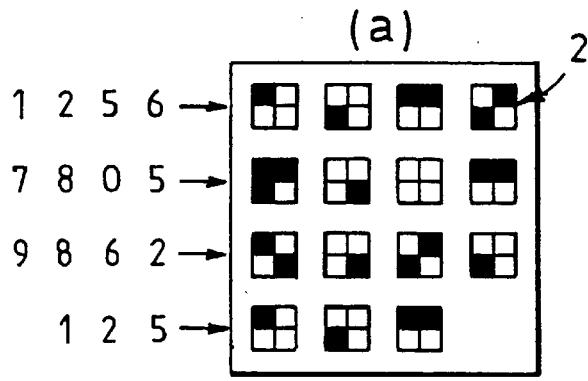
FIG. 4 illustrates a positional arrangement of the data code shown in FIG. 1.
Figure 4:
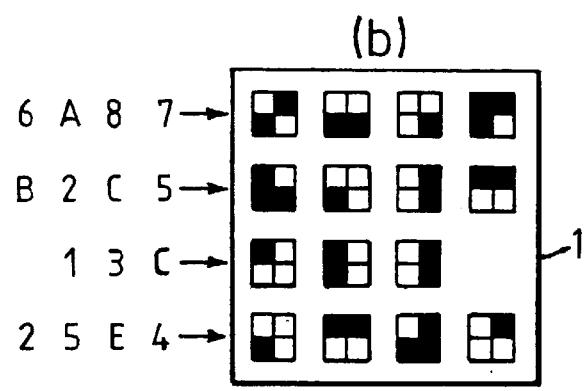

FIG. 4a illustrates possible positional arrangements of the data code in decimal notation while FIG. 4b illustrates the possible arrangement hexidecimal notation when printed on a sheet 1.

Figure 5:
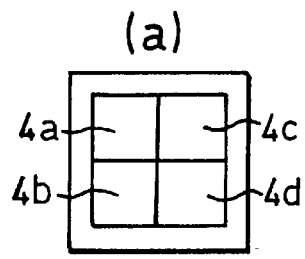
FIG. 5 schematically represents variations of a unit.
Figure 5:
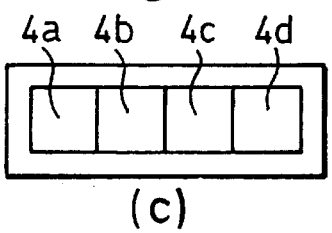
Figure 5:
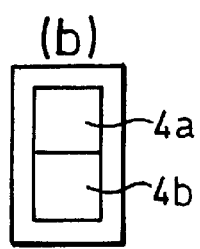
Figure 5:
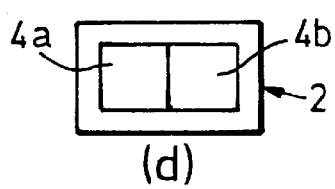
Figure 5:
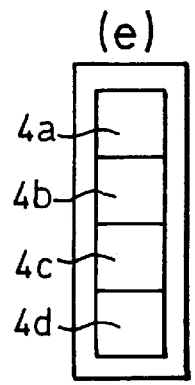

FIG. 5 illustrates a number of different types of units which may be used in the data code but the present invention is not limited just to these types of units. Any one of these units may be used to form a data code applicable to the notation which the code is representing. For example, a notation requiring 6 regions for each unit may be denoted by the combination of units 5a and 5b. Accordingly, the following types of notation can be represented by a minimum number of regions or bits:

| NOTATION TYPES | MINIMUM NUMBER OF REGIONS OR BITS |
| --- | --- |
| Decimal notation type | 4 bits |
| Roman alphabet (Capitals), decimal and punctuation marks | 6 bits |
| Japanese kana characters and punctuation marks | 7 bits |
| Roman characters, including capitals and lower case, kana characters, decimals and punctuation marks | 8 bits |
| Frequently used ideographs, kana characters, Roman characters and punctuation marks | 12 or 16 bits |
| Morse signals | 6 bits |
| Braille | 6 bits |

For example, FIG. 6 illustrates the Roman Alphabet of capitals in terms of binary notation and the data code. For example, the letter N may be represented by the binary notation 00100011 or by 2 units. The data code, therefore, facilitates reading, understanding and remembering codes of the Roman alphabet in capitals.

Figure 7:
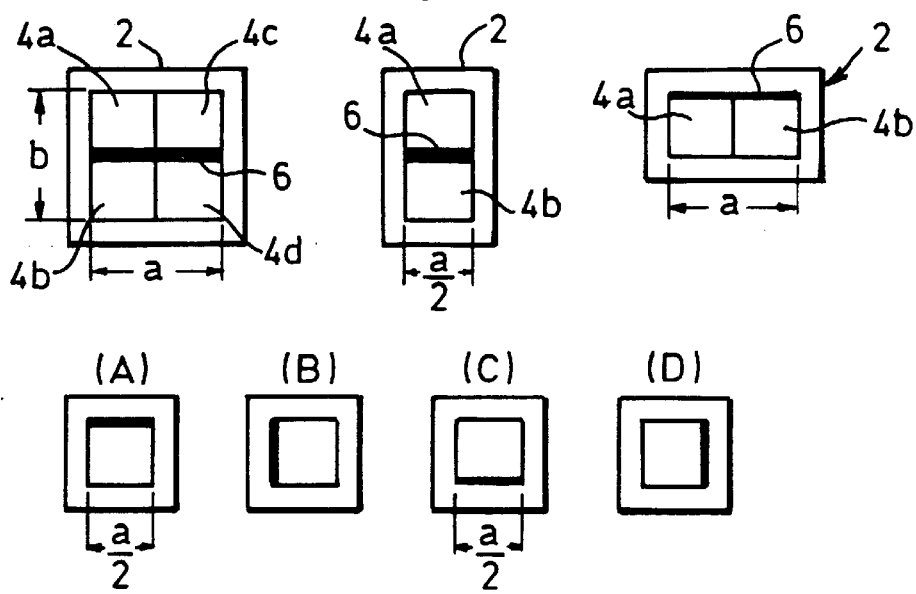
FIG. 7 illustrates units of a data code according to an embodiment of the present invention.
Figure 8:
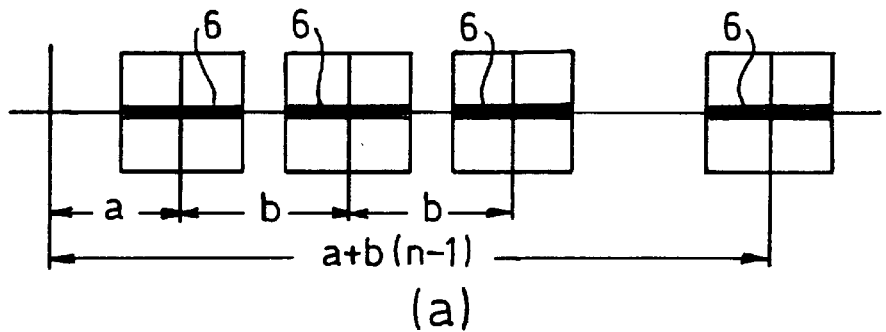
FIG. 8 illustrates each unit being coupled to means for distinguishing the orientation of the units of the embodiment shown in FIG. 6.
Figure 8:
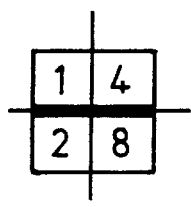
Figure 8:
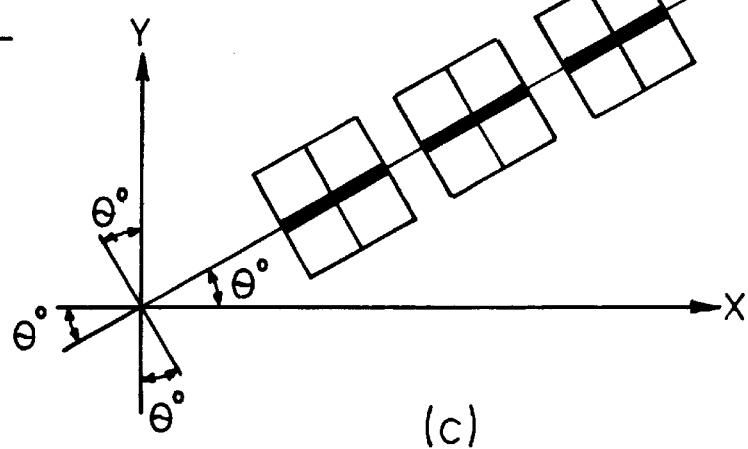

FIG. 7 illustrates a data code according to an embodiment of the invention. The regions 4 of each of the units 2 include means for distinguishing the orientation of the unit, such as a bar 6. The bar 6 facilitates reading of the code and enables the code to be correctly positioned. If the sensor reads the first column while viewing position a, then the sensor will recognize that the center of the unit is not aligned with the origin of its two dimensional axis and thus will adjust the reading of the columns until it is aligned. As shown in FIG. 8a, the bars 6 should be aligned along the X axis having the center of each unit aligned with the origin of the two dimensional axis in the sensor. However, this embodiment enables the data code to be read easily, even if the data code is placed at an angle θ to a reader. For example, in FIG. 8c alignment of the data code using the bars 6 enables the sensor to compensate for the code being at an angle θ.

Figure 9:
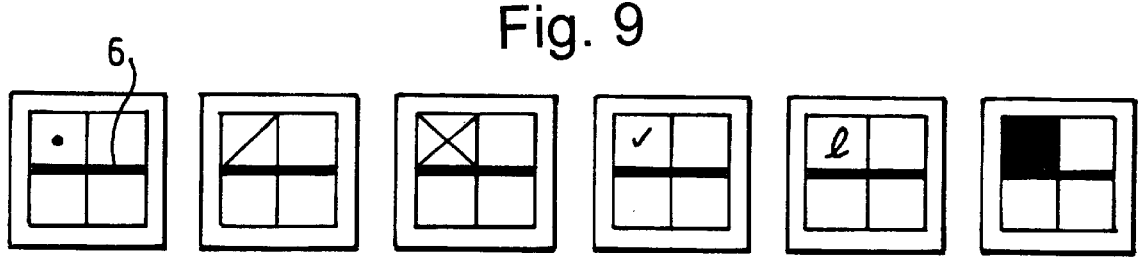
FIG. 9 illustrates examples of the preferred embodiment shown in FIG. 6 having known symbols printed thereon.

Each unit of the data code may also have known characters or punctuation marks printed in some or all of the regions as shown in FIG. 9. This further enables the data code to be easily read and interpreted.

The data code facilitates reading and understanding of decimal, hexidecimal and binary notation in both education and industry. The data code may be written by hand and may be used to operate electronic devices thereby making such devices more accessible. Furthermore, the data code may be used as an interface language between characters of different languages.

Figure 10:
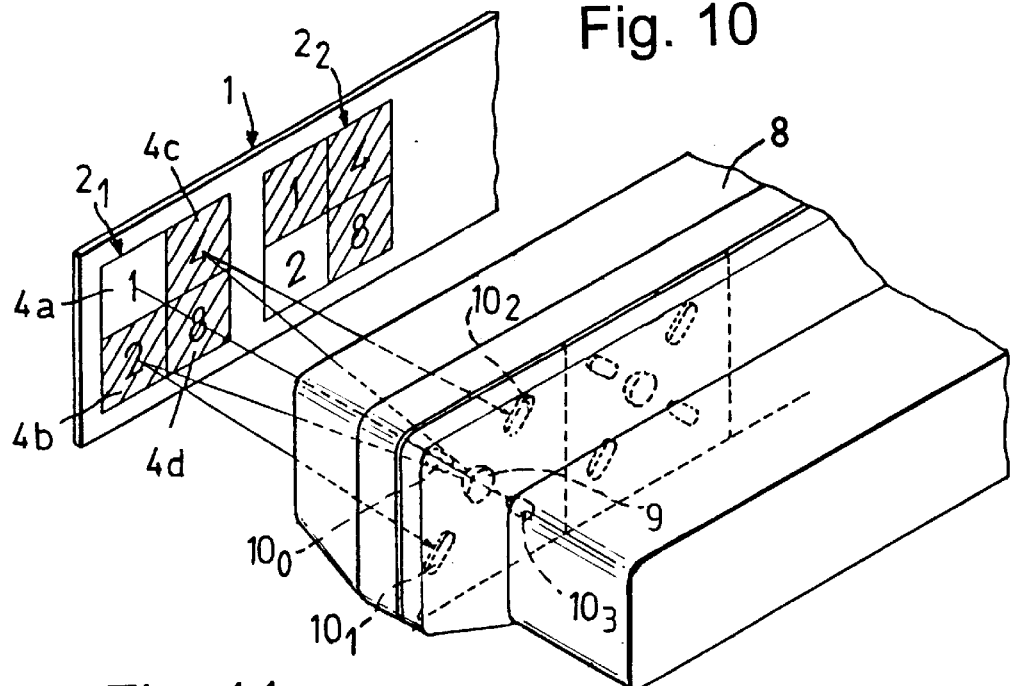
FIG. 10 illustrates a data code and apparatus for reading thereof according to a second preferred embodiment of the present invention.
Figure 11:
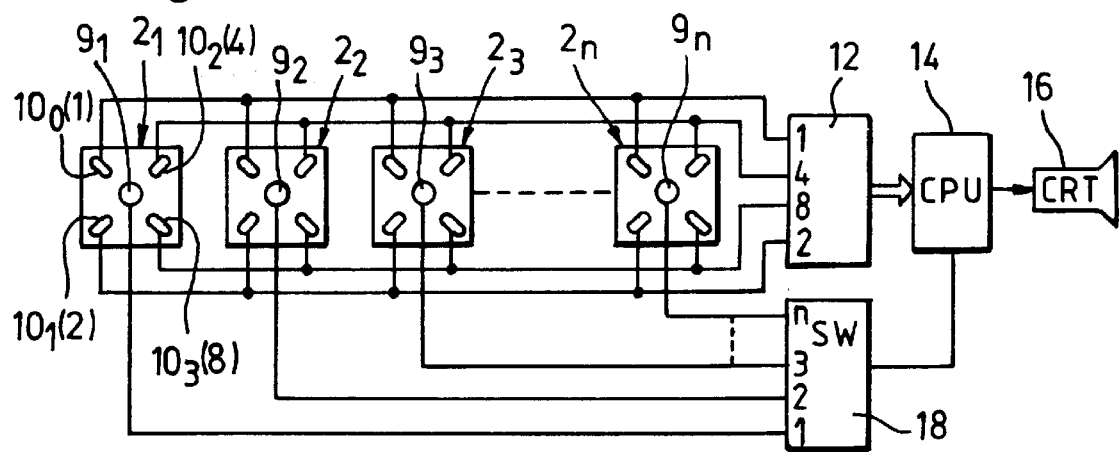
FIG. 11 is a schematic block diagram of the apparatus shown in FIG. 10.

FIGS. 10 to 13 illustrate a data code printed on a sheet 1 and an apparatus 8 for reading the data code. Referring to FIG. 10 and 11, the apparatus 8 illuminates each unit of the data code using a light source 9, such as an LED lamp or a laser beam. The reflected light is received by respective photoreceptors 10, such as a Mos-type sensor or CDD. The photoreceptors 10 are coupled to a decoder 12 having input terminals 1, 2, 4, 8corresponding to each photoreceptor 10 for the appropriate region 4. The input signals are extracted in binary column order and sent to a CPU 14 for displaying or converting the digital signals into the appropriate numbers, characters or symbols for a suitable display 16.

The photoreceptors 10 are responsive to the variations in the regions since less light is reflected back from a shaded region. The photoreceptors will record the binary number 1 in response to the light received from a shaded region and the binary number 0 in response to the light being received from a blank region. In conjunction with each region representing a column of binary notion, the apparatus 8 can read the binary numbers directly from the data code, thereby obviating any analog to digital conversion. Each unit 2 is illuminated by the light source 9 controlled by a switch 18 which illuminates each unit 2 in turn. This enables the photoreceptors 10 to submit signals in succession.

Figure 12:
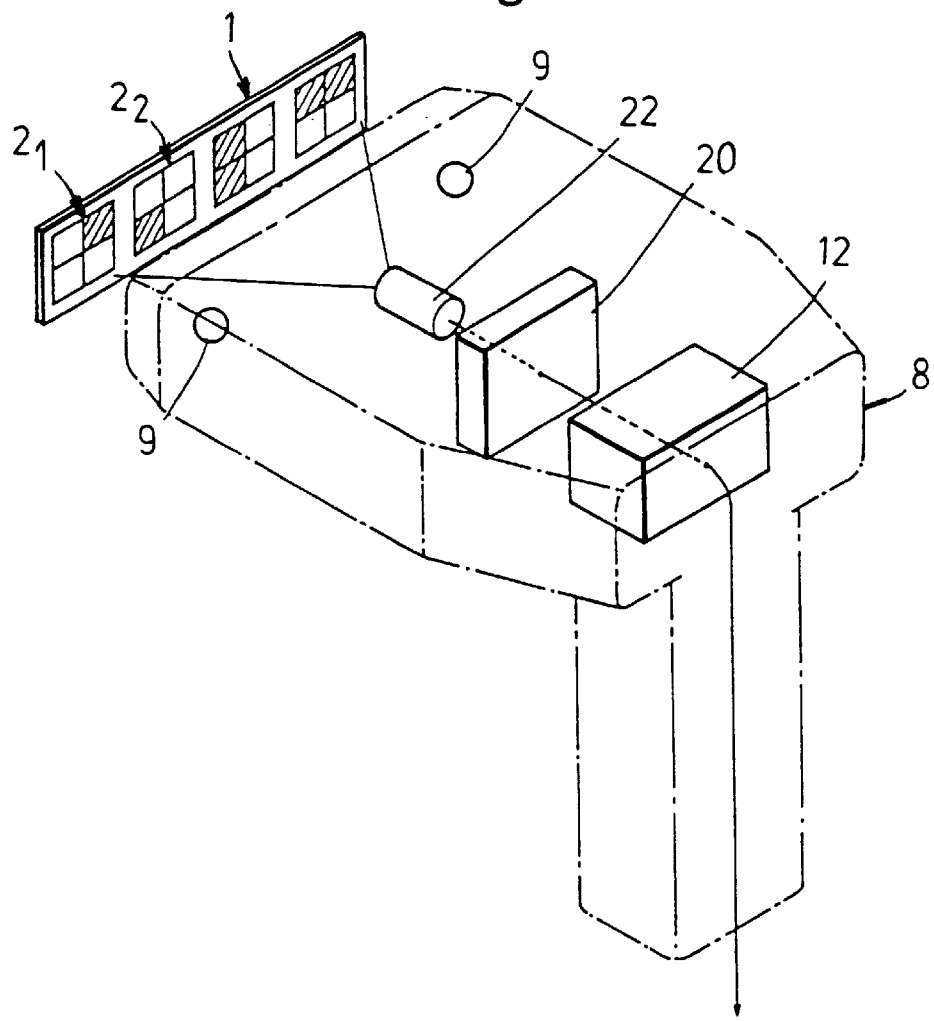
FIG. 12 is a schematic diagram of the apparatus according to a third preferred embodiment.
Figure 13:
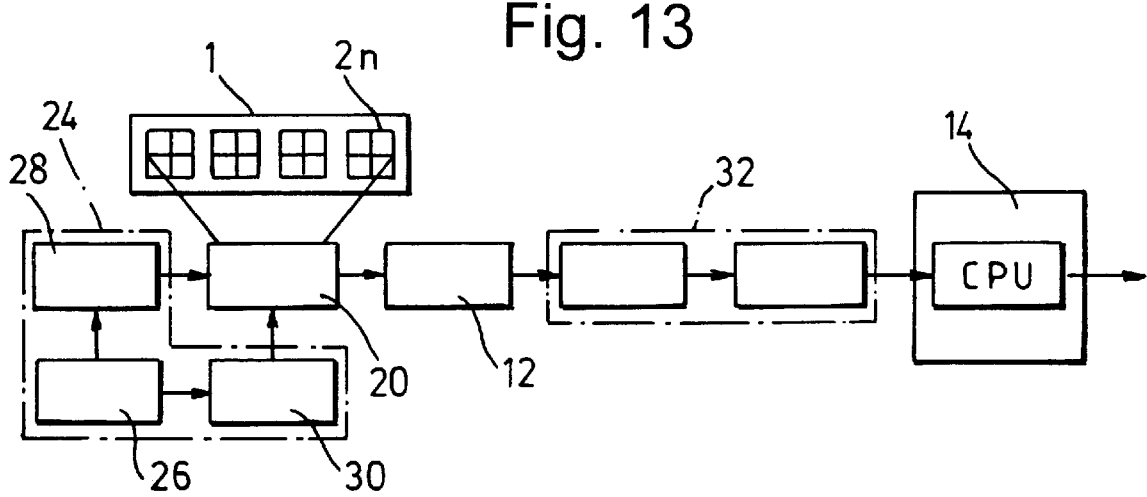
FIG. 13 is a schematic block diagram of the circuit of the apparatus shown in FIG. 12.

Alternatively, as shown in FIGS. 12 and 13, the signals from the illuminated data code may be received by an image sensor 20 via an optical system 22. The sensor 20 includes two or more photoreceptors 10 in a two dimensional array. The sensor produces a signal which is outputted in a time series and stored in a memory 32. The stored data is displayed sequentially to reveal the data code. A circuit 24, shown in FIG. 13, enables the signals to be co-ordinated and is constituted a clock 26, a vertical synchronizing circuit 28, and a horizontal synchronizing circuit 30. Each signal received at the terminals 1, 2, 4 and 8 of the decoder 12 is sent to the CPU 14 via the buffer memory and control unit 32.

These reading methods enable the system to avoid analog to digital conversion as required by the prior art systems.

The foregoing description has been given by way of example only, and it will be appreciated by persons skilled in the art that modifications may be made without departing from the scope of the present invention.

I claim:

1. A data code support, such as a card or sheet comprising a surface having at least one predetermined unit of surface area delineated thereon, said at least one predetermined unit of surface area being divided into four regions having similar dimensions, each region of said four regions constituting a unitary recording area and portraying a different binary notation commencing with the lowest order of binary notations and thereafter successive binary notations, said lowest order of binary notations being depicted by a unitary recorded area or region being shaded to represent the lowest order of a binary notation value of a group of selected binary notation values, the remainder of said regions selectively being shaded to depict any one of a predetermined number of selected binary notation values.

2. The data code support as claimed in claim 1 further comprising means for distinguishing the orientation of said four regions of said at least one predetermined unit of surface area.

3. The data code support as claimed in claim 1 wherein said at least one predetermined unit of surface area comprises a square having four regions and each region comprising a square.

4. The data code support as claimed in claim 1 wherein said at least one predetermined unit of surface area comprises a circle.

5. The data code support as claimed in claim 1 wherein said at least one predetermined unit of surface area comprises a triangle.

6. The data code support as claimed in claim 2, 3, 4 or 5 wherein said means for distinguishing the orientation of said at least one predetermined unit of surface area comprises a shaded bar.

7. The data code support as claimed in claim 2 wherein said means for distinguishing the orientation of said at least one predetermined unit of surface area comprises a shaded bar dissecting said at least one predetermined unit of surface area into two parts, each of said two parts having two regions.

8. The data code support as claimed in claim 1 wherein said binary notation includes notations selected from the group consisting of decimal and hexidecimal notations.

9. The data code support as claimed in claim 3 wherein said binary notation includes notations selected from the group consisting of decimal and hexidecimal notations.

10. The data code support as claimed in claim 9 wherein the value of each region of said four regions is printed thereon.

11. An apparatus for reading a data code located on a data code support, said data code support comprising at least one predetermined unit of surface area delineated on said data code support, said at least one predetermined unit of surface area being divided into four regions having similar dimensions, each region of said four regions constituting a unitary recording area and portraying a different binary notation commencing with the lowest order of binary notations and thereafter successive binary notations, said lowest order of binary notations being depicted by a unitary recorded area or region being shaded to represent the lowest order of a binary notation value of a group of binary notation values, the remainder of said regions selectively being shaded to depict any one of a predetermined number of binary notation values, said apparatus comprising means for illuminating said at least one predetermined unit of surface area; means for receiving the reflected illumination from said at least one predetermined unit of surface area; and a decoder coupled to said means for receiving said reflected illumination for identifying a reflection from a shaded region as a binary 1 and for identifying a reflection from a blank region as a binary 0 to enable said data code to be read directly by said apparatus into digital signals.

12. The apparatus as claimed in claim 11 wherein said means for illuminating said at least one predetermined unit of surface area comprises a light source selected from the group consisting of an LED lamp and a laser beam.

13. The apparatus as claimed in claim 1 wherein said means for receiving said reflected illumination comprises a photoreceptor.

14. An apparatus for reading a data code located on a data code support, said data code support comprising at least one predetermined unit of surface area delineated on said data code support, said at least one predetermined unit of surface area being divided into four regions having similar dimensions, each region of said four regions constituting a unitary recording area and portraying a different binary notation commencing with the lowest order of binary notations and thereafter successive binary notations, said lowest order said binary notations being depicted by a unitary recording area or region being shaded to represent the lowest order of a binary notation value, said apparatus comprising means for illuminating said data code, an image sensor for receiving the illumination reflected from said data code to produce a signal dependent upon said shaded region; means for storing said signal; and means for sequentially displaying said signal.

15. The apparatus as claimed in claim 14 further comprising a switch coupled to said means for illuminating said data code for enabling said at least one predetermined unit to be illuminated and read sequentially.

16. The apparatus as claimed in claim 14 wherein said image sensor comprises an optical system coupled to a plurality of photoreceptors equal in number to said four regions, said plurality of photoreceptors being disposed in a four-dimensional array.

17. The apparatus as claimed in claim 16 further comprising means for coordinating the signals produced by said plurality of photoreceptors.

18. A data code recognition method, said method comprising the steps of:

defining a data code support having a surface with at least one predetermined unit of surface area delineated thereon, said at least one predetermined unit of surface area being divided into four equal regions having similar dimensions, each region of said four regions constituting a unitary recording area and portraying a different binary notation commencing with the lowest order of binary notations and thereafter successive binary notations, said lowest order of binary notations being depicted by a unitary recording area or region being shaded to represent the lowest order of a binary notation value of a group of selected binary notation values, the remainder of said regions selectively being shaded to depict any one of a predetermined number of selected notation values;

placing an apparatus for reading a data code on said defined data code support adjacent said defined data code support;

directing light signals onto said data code support from a light source of said apparatus for reading the data code of said data code support;

receiving the reflected or transmitted light signals from said light source directed onto said data code support by said apparatus for reading the data code;

simultaneous with said receiving step, corresponding said light signals received by said apparatus for each shaded region being read by said apparatus as 1, and for each region being not so shaded as 0, such that said data code on said data code support is read directly into digital signals.

19. The data code recognition method of claim 18 further comprising the steps of:

forwarding the corresponding light signals received by said apparatus for reading the data code in a time series; and storing said light signals in a buffer memory.

20. The data code recognition method of claim 19 further comprising the steps of:

displaying said stored signals as image signals.

21. The method of claim 18 wherein said step of placing said apparatus further comprises the step of choosing said apparatus from a group consisting of an apparatus having photoreceptors and an apparatus having optical readers for reading the data code.

22. The method of claim 19 wherein said step of placing said apparatus further comprises the step of choosing said apparatus from a group consisting of an apparatus having photoreceptors and an apparatus having optical readers for reading the data code.

23. The method of claim 20 wherein said step of placing said apparatus further comprises the step of choosing said apparatus from a group consisting of an apparatus having photoreceptors and an apparatus having optical readers for reading the data code.

* * * * *

UNITED STATES PATENT AND TRADEMARK OFFICE
CERTIFICATE OF CORRECTION

PATENT NO : 5,984,189
DATED : November 16, 1999
INVENTOR(S) : Makoto Tomioka

It is certified that error appears in the above-identified patent and that said Letters Patent are hereby corrected as shown below:

Column 1, line 1, between lines 7 and 8 insert
---- BACKGROUND OF THE INVENTION
    1. FIELD OF THE INVENTION ----.

Column 1, line 8, after "and" insert ---- an ----.

Column 1, line 11, before "DESCRIPTION OF THE PRIOR ART" insert ---- 2. ----.

Column 1, line 38, after "which is" insert ---- divided ----.

Column 1, line 53, delete "are" and insert ---- were ----.

Column 2, line 3, before "with" insert ---- one unit, ----.

Column 2, line 10, delete "comprising" and insert ---- also includes ----.

Column 2, line 11, after "code" insert ---- , ----.

Column 2, line 35, change "hexadecimal" to ---- hexidecimal ----.

Column 2, line 42, after "FIG. 1" delete the colon ":" and insert a semi-colon ---- ; ----.

Column 2, line 56, after "invention" delete the colon ":" and insert a semi-colon ---- ; ----.

Column 2, line 66, delete "1 as" insert ---- 1. As ----.

Column 2, line 67, delete "date" and insert ---- data ----.

UNITED STATES PATENT AND TRADEMARK OFFICE
CERTIFICATE OF CORRECTION

PATENT NO : 5,984,189
DATED : November 16, 1999
INVENTOR(S) : Makoto Tomioka

It is certified that error appears in the above-identified patent and that said Letters Patent are hereby corrected as shown below:

Column 3, line 33, change "hexadecimal" to ---- hexidecimal ----.

Column 3, line 35, delete "100:" and insert ---- 100; ----.

Column 3, line 51, change "hexadecimal" to ---- hexidecimal ----.

Column 3, line 56, after "arrangement" insert ---- of the data code in ----.

Column 3, line 51, change "hexadecimal" to ---- hexidecimal ----.

Column 3, line 56, after "arrangement" insert ---- of the data code in ----.

Column 4, line 59, delete "8corresponding" and insert ---- 8 corresponding ----.

Column 5, line 16, after "constituted" insert ---- by ----.

Column 6, line 46, delete "said" and insert ---- of ----.

Signed and Sealed this

Tenth Day of April, 2001

Attest:

NICHOLAS P. GODICI

*Attesting Officer*     *Acting Director of the United States Patent and Trademark Office*